United States Patent
Danekas

[15] 3,642,242
[45] Feb. 15, 1972

[54] TRAVEL TRAILER SUPPORTING MEANS

[72] Inventor: Floyd E. Danekas, 1283 Sixth St., La Salle, Ill. 61301

[22] Filed: Feb. 25, 1970

[21] Appl. No.: 13,908

[52] U.S. Cl. ..................................248/354 R, 280/150.5
[51] Int. Cl. ..........................................F16m 13/00
[58] Field of Search................248/352, 354 C, 354 L, 354 P, 248/354 S, 354 H, 354 R; 280/150.5, 475; 254/86

[56] References Cited
UNITED STATES PATENTS

| | | |
|---|---|---|
| 2,436,799 | 3/1948 | Frost...................................248/354 S |
| 2,665,938 | 1/1954 | McCrossen ..................280/150.5 UX |
| 2,885,181 | 5/1959 | McCully et al. .........................254/86 |
| 2,895,628 | 7/1959 | Gebhart..............................248/354 R |
| 3,186,570 | 6/1965 | Bunnell ..........................248/354 R X |

Primary Examiner—William H. Schultz
Attorney—Davis, Lucas, Brewer & Brugman

[57] ABSTRACT

Legs mounted adjacent corners of travel trailer swingable horizontally on vertical axis and adjustable longitudinally on an axis converging upwardly with that vertical axis.

3 Claims, 3 Drawing Figures

PATENTED FEB 15 1972
3,642,242
Fig. 1.
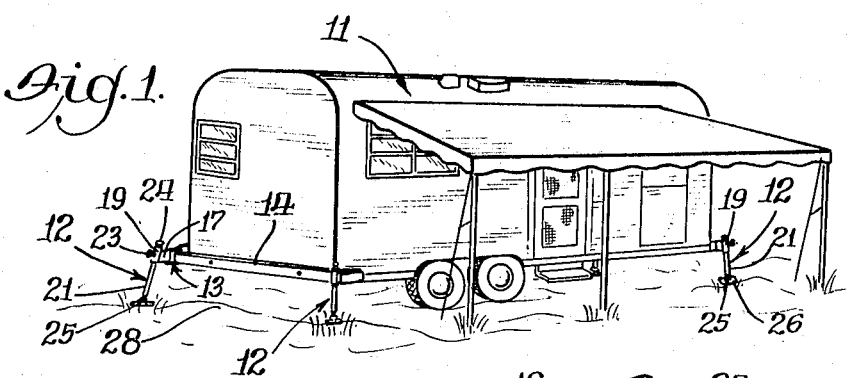
Fig. 2.
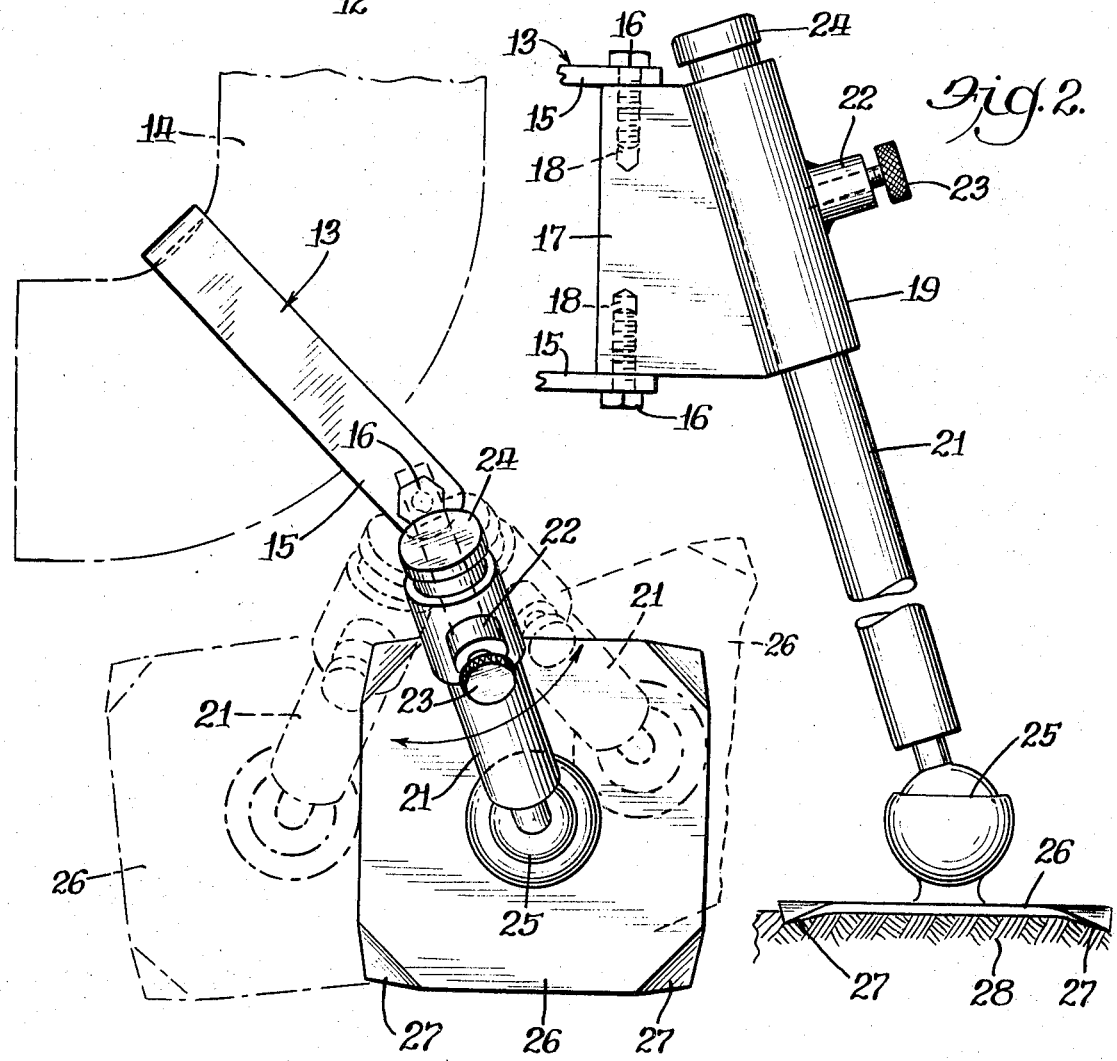
Fig. 3.
Inventor:
Floyd E. Danekas
By:
Davis, Lucas, Brewer & Brugman
Attorneys

TRAVEL TRAILER SUPPORTING MEANS

BACKGROUND OF THE INVENTION

1. Field of the Invention

The invention relates to travel trailers and more particularly to means inoperative during travel and operable when setting up trailer for stationary use to stabilize the same and keep it level.

2. Description of the Prior Art

Tripod jacks commonly are used for this purpose and separately adjustable outriggers or legs have been provided, as in U.S. Patent Nos. 2,734,726; 2,227,900 and 3,096,065, which include legs that may be folded up from an operative to a traveling or inoperative position. But they are adjustable only vertically when in load-assuming or operative position and are not effective on uneven supporting surfaces.

SUMMARY OF THE INVENTION

This invention obviates such difficulties by including for each leg means swivel plate means adjustably swingable horizontally on a vertical axis to provide a wide range of selection of operative positions of the leg means for maximum effectiveness in supporting the trailer level, especially on an uneven surface. Each swivel plate means also supports the leg means for longitudinal adjustment along an axis converging upwardly with its vertical axis so that the trailer will be most effectively stabilized, whereby the supporting forces exerted by the legs may be along leg axes so disposed that their upward extensions substantially intersect.

In the drawings:

FIG. 1 is a perspective view of a travel trailer set up for stationary use by means of supporting means embodying the features of this invention;

FIG. 2 is a side elevation of one of the trailer supporting means of FIG. 1 in operative position; and FIG. 3 is a plan view illustrating the supporting means in full lines substantially in its position of FIG. 2 and in other horizontally adjusted positions in broken lines.

DESCRIPTION OF THE PREFERRED EMBODIMENT

Referring more particularly to FIG. 1, reference numeral 11 indicates in general a travel trailer of any usual configuration which is shown set up in position for stationary use by means of a plurality of supporting means which are designated generally by reference numeral 12. These supporting means are individually adjustable and, as shown in FIG. 1, preferably are mounted adjacent the respective corners of the trailer 11. In each instance, one of these supporting means 12 comprises a bracket means 13 secured in any suitable manner to the frame of the trailer 11 or, as shown at the left end of FIG. 1 and in FIG. 3, to a bumper member 14 which is rigidly connected in any suitable manner to the trailer frame. It has been found from the standpoint of convenience that the bracket means 13 should include horizontally extending upper and lower arms 15 with vertically aligned apertures adjacent their outer ends for receiving pintle pins or bolts 16, as best seen in FIG. 2. These bracket means 13 may be secured in any suitable manner to the trailer 11 or a bumper member 14, as by welding, or the like, and in the illustrated embodiment are substantially U-shaped to frictionally engage the bumper member, with their arms 15 extending horizontally outwardly therefrom adjacent respective corner portions of the trailer.

Each of these supporting means 12 also includes swivel plate means comprising a plate 17 having vertically extending, coaxial, tapped apertures 18 in its upper and lower edges or marginal portions for receiving the bolts 16. The outer edge of each plate 17 is angularly disposed relative to the vertical axis of the apertures 18, and secured thereto in any suitable manner, such as by welding, is a tube 19 slidably receiving a leg or rod 21 comprising part of longitudinally adjustable leg means carried by the swivel plate means.

For the purpose of securing the leg 21 in any selected longitudinally or substantially vertically adjusted position in the tube 19, the latter is provided with an internally threaded collar 22 welded or otherwise secured to the outer surface of the tube 19, as best seen in FIG. 2, with the tapped bore thereof extending through the wall of the tube to receive a manually operable set screw 23 for clamping or locking engagement with the leg 21. The upper end of this leg 21 preferably is provided with a cap 24 to limit downward movement of the leg means relative to the tube 19 of the swivel plate means.

The lower end of the axially slidable leg 21 is connected by a suitable ball and socket means 25 of well-known construction to a foot plate 26, the corner portions of which preferably are upset or struck downwardly to provide cleats 27 to facilitate engagement of the plate with the ground or other supporting surface 28.

It will be seen from the above that each of these supporting means 12 is adapted to be adjustably swung horizontally about a vertical axis defined by the pins or bolts 16. Three such adjustable positions are illustrated in full and broken lines in FIG. 3. It also will be appreciated that the leg means may readily be adjusted substantially vertically or in the direction of the axis of the leg 21 merely by manually releasing the set screw 23, moving the leg means to desired position and then reclamping the same by means of that set screw.

Consequently, when it is desired to prepare the trailer 11 for travel, each of the leg means may be raised to an uppermost position and clamped therein by the associated set screw 23, and it is preferred that the swivel plate 17 then be swung horizontally to place the supporting means 12 interiorly of the lateral sides of the trailer. The supporting means then may be secured in such travel or inoperative position by tightening of one or both of the bolts 16. Additional means for maintaining the supporting means in such travel position are not necessary.

Conversely, when it is desired to set the trailer up level in position for stationary use, loosening of the bolts 16 and the set screws 23 will permit the most advantageous positioning of each of the individual supporting means 12, depending upon the character or nature of the supporting surface 28. Even though this surface be uneven, such simple positioning and securing of the supporting means 12 by subsequent tightening of the bolts 16 and set screws 23 will assure the trailer being maintained level. In this connection, it will be noted that each swivel plate 17 is individually horizontally adjustable on its own vertical axis defined by the bolts 16 to so position the associated leg means that the upward extensions of the longitudinal axes of the legs 21 will substantially intersect. This assures maximum effectiveness in supporting the trailer level, especially on an uneven surface, and maximum stability thus will be attained by virtue of the upwardly converging directions of the trailer-supporting forces exerted by the supporting means when in load-assuming or operative position.

I claim:

1. Travel trailer supporting means adjustably attachable to a trailer for supporting the same level on an uneven surface, comprising bracket means secured to the trailer, swivel plate means vertically axially supported by said bracket means for horizontal swinging adjustment relative thereto, means for securing said swivel plate means in any selected adjusted position, and longitudinally adjustable leg means secured to said swivel plate means and angularly disposed to define upwardly converging acute angles with the vertical axes thereof said swivel plate means including vertically aligned apertures, pintle pins in said apertures cooperating with said bracket means, and a tube angularly disposed relative to the vertical axis of said pintle pins for slidably receiving the associated said leg means.

2. Travel trailer supporting means according to claim 1, wherein said bracket means comprises a separate bracket secured to each of the trailer adjacent corners thereof.

3. Travel trailer supporting means according to claim 2, whereby each said swivel plate means is individually horizontally adjustable on its own vertical axis to so position the associated said leg means that the upward extensions of the longitudinal axes thereof substantially intersect.